Inventor
Max E. Blumenstein,
Attorney

Patented Mar. 8, 1949

2,463,739

UNITED STATES PATENT OFFICE 2,463,739

RETICULE FOR TELESCOPES

Max E. Blumenstein, Hyattsville, Md.

Application November 21, 1945, Serial No. 630,096

5 Claims. (Cl. 33—50)

This invention relates to optical instruments of the telescope type. In such instruments the employment of a reticle is at times desirable and at other times undesirable. Accordingly, the general object of the present invention is to provide an optical instrument of the telescope type with a reticle which may be shifted between operative and inoperative positions, and to provide simple, practical means for readily and easily shifting the same between said positions.

In some instances it may be desirable to adapt an optical instrument of the telescope type for advertising, amusement or other purposes by providing the reticle thereof with advertising or other matter to appear in any desired manner upon a scene viewed through the instrument. Moreover, in any such instance it may be desirable to have the advertising or other matter appear for only a limited period of time, as, for example, in instances where a charge is made for viewing a scene through the telescope for a limited period of time. Accordingly, another object of the present invention is to provide simple, practical means whereby the reticle, after being shifted to its operative position, is returned automatically to its inoperative position following the elapse of a predetermined period of time.

With the foregoing and other objects in view, which will become more fully apparent as the nature of the invention is better understood, the same consists in an optical instrument of the telescope type including a reticle and operating means therefor embodying the novel features of construction, combination and arrangement of parts as will be hereinafter more fully described, illustrated in the accompanying drawings and defined in the appended claims.

In the accompanying drawings, wherein like characters of reference denote corresponding parts in the views.

Figure 1:
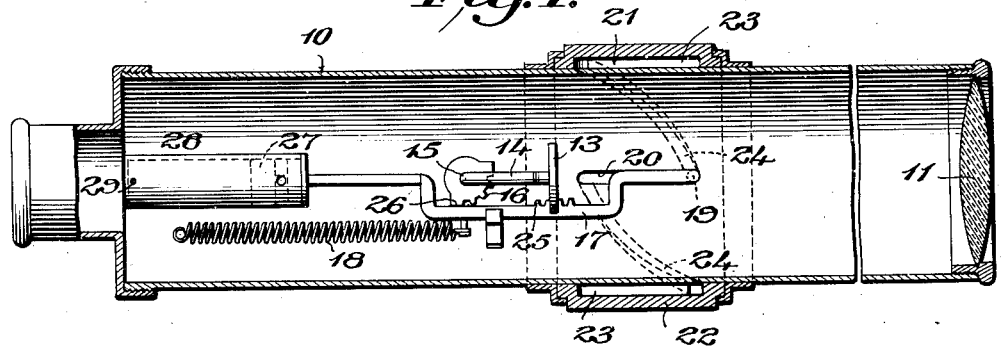
Figure 1 is a fragmentary longitudinal section through an optical instrument of the telescope type including a reticle and operating means therefor constructed in accordance with one practical embodiment of the invention, the reticle being shown in its operative position.
Figure 2:
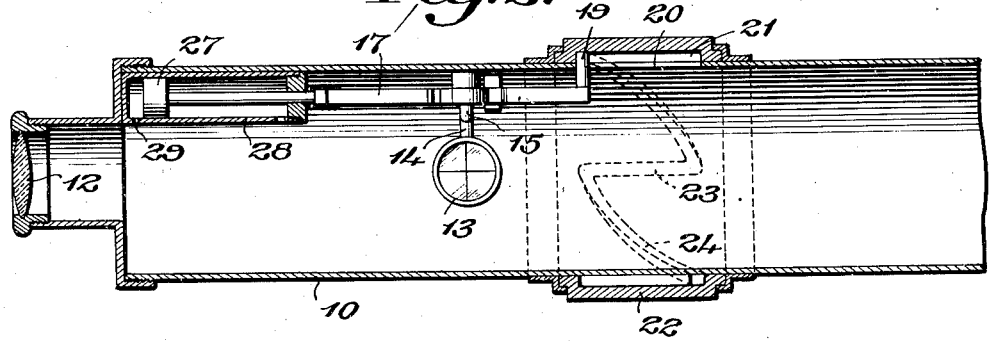
Figure 2 is a longitudinal section at right angles to Figure 1 showing the reticle in its inoperative position.
Figure 3:
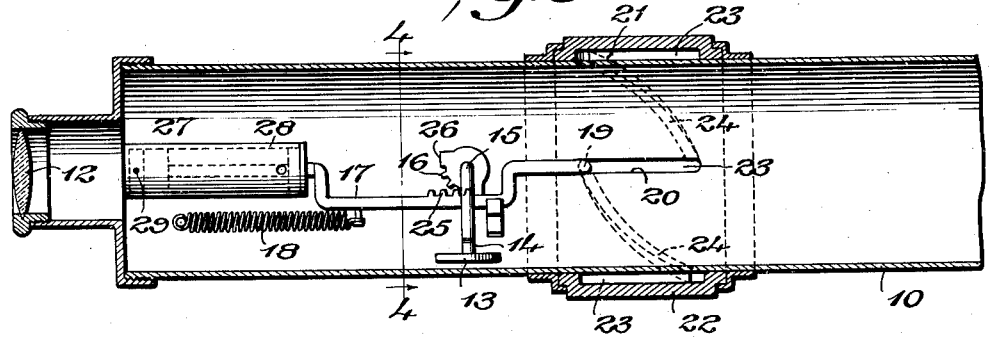
Figure 3 is a view similar to Figure 1 showing the reticle in its inoperative position.
Figure 4:
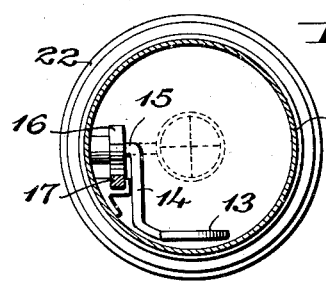
Figure 4 is a cross section on the line 4—4 of Figure 3.

Referring to the drawings in detail, 10 designates the barrel of an instrument of the telescope type, 11 designates an object lens located at the front end of said barrel, 12 designates an eye lens located at the rear end of said barrel, and 13 designates a reticle mounted within the barrel 10 for movement between an operative position in which it is disposed coaxially with the optical axis of the instrument, approximately at the focal point of the object lens 11, as shown in Figure 1, and an inoperative position in which it is disposed out of the line of vision to one side of the optical axis of the instrument, as illustrated in Figures 2, 3, and 4.

The reticle 13 may comprise either a frame provided with cross hairs or a transparent element having hair lines engraved or otherwise suitably provided thereon. Alternatively, either in addition to or exclusively of cross hair or cross hair lines, said reticle may be provided in any suitable manner with words, symbols, or a picture or the like of any object or objects to appear in any desired manner upon a scene viewed through the instrument. Moreover, while said reticle may be mounted in any suitable manner for movement between its operative and inoperative positions, it preferably is mounted for swinging movement between said positions upon the free end of an arm 14 extending laterally from a shaft 15 which is disposed at right angles to the barrel 10 and is suitably mounted for rotation at one side of said barrel. Thus, by rotating said shaft in one direction through an angle of ninety degrees the reticle may be swung from its inoperative to its operative position, while by rotating said shaft in the opposite direction through an angle of ninety degrees, said reticle may be swung from its operative to its inoperative position.

Fixed on the shaft 15 is a spur gear sector 16 with which cooperates a rack bar 17 which extends longitudinally of the barrel 10 and which may be supported and guided for longitudinal movement in any desired manner. This rack bar is constantly urged rearwardly by a suitable spring 18 and carries at its front end a pin 19 which extends outwardly through a longitudinally extending slot 20 in the barrel 10 into an internal slot 21 in a collar 22 which surrounds the barrel 10 and is rotatable with respect thereto, but which is suitably held against longitudinal movement therealong.

The slot 21 includes a plurality of straight, angularly spaced apart, longitudinally extending portions 23 and a plurality of helical portions 24 connecting said straight portions. The straight portions 23 are of equal length and disposed in the same transverse plane, and the helical portions 24 all are of the same pitch and extend in the same direction, each from the rear end of a related straight portion 23 to the front end of the next adjacent straight portion 23 in one direction angularly. Thus, assuming that the rack bar 17 is in its rearmost position and that the pin 19 is in the rear end of any one of the straight portions 23 of the slot 21, it is apparent that the collar 22 may be rotated in only one direction and that if it is rotated in that direction through an angle corresponding to the angular spacing of the slot straight portions 23, the pin 19 and the rack bar 17 will be moved forwardly a distance corresponding to the length of the slot straight portions 23. It is further apparent that upon the completion of said amount of rotation of the collar 22, the pin 19 will be disposed at the forward end of the next slot straight portion 23 and therefore will be unrestrained against rearward movement. Consequently, the spring 18 then will be effective to move the rack bar 17 rearwardly until the pin 19 reaches the rear end of the slot straight portion 23. The collar 22 then will be effective, by rotation in the permissible direction through an angle corresponding to the angular spacing of the slot straight portions 23, to again move the rack bar 17 forwardly. In other words, the arrangement is such that by a limited amount of rotation of the collar 22 when the rack bar 17 is disposed rearwardly, said rack bar will be moved forwardly and then will be released to be returned to its rearmost position by the spring 18.

The rack bar 17 carries a series of teeth 25 for cooperation with the spur gear 16, and said series of teeth are of a collective length and so located with respect to said bar that when the latter is in its rearmost position the reticle 13 is in its inoperative position and upon a predetermined amount of initial forward movement of said bar the reticle is swung to its operative position. Thereafter, upon continued forward movement of the rack bar 17, the teeth 25 move forwardly beyond the spur gear 16, but upon the reticle 13 reaching its operative position it is held in that position in any suitable manner, as, for example, by engagement of a flat faced peripheral portion 26 of the spur gear 16 with a flat face of the rack bar 17 rearwardly of the teeth 25. Consequently, when the rack bar is in its forwardmost position, rearward movement thereof is not immediately effective to initiate swinging movement of the reticle 13 from its operative position toward its inoperative position. On the contrary, the rack bar partakes first of a certain amount of rearward movement without disturbing the operative position of the reticle and only begins to swing the reticle to its inoperative position when the teeth 25 engage the spur gear 16. Thus, if rearward movement of the rack bar 17 is retarded, it is apparent that whenever the reticle is swung to its operative position it will remain in that position for a limited period of time and then will be swung into its inoperative position.

While any suitable means may be provided for retarding rearward movement of the rack bar 17, one suitable means for this purpose is illustrated in the drawings as comprising a piston 27 carried by the rack bar 17 and operating in a cylinder 28 mounted in any suitable manner in the barrel 10. The arrangement in this respect is such that when the rack bar 17 is in its forwardmost position the piston 27 is in the forward end of the cylinder 28. In the rear end of the cylinder is a small bleed opening 29. Consequently, the rack bar may move rearwardly only at a relatively slow rate as determined by escape of air from the cylinder 28 through the small bleed opening 29. It will thus be seen that the present invention provides manually operable means for swinging the reticle 13 to its operative position and automatic means for returning it to its inoperative position following the elapse of a predetermined period of time.

Obviously, the collar 22 may be provided with a slot 21 so shaped that by rotation of said collar the reticle may be swung to either its operative or its inoperative position in either of which positions it may remain as long as desired. Obviously, too, if the slot 21 includes straight and helical portions, there may be as many of these portions as desired, since varying their number simply involves varying the pitch of the helical portions.

From the foregoing description considered in connection with the accompanying drawings, it is believed that the construction and operation of the present reticle shifting means will be clearly understood. It is desired to point out, however, that while only a single, specific embodiment of said means has been illustrated and described, the same is readily capable of various other specifically different embodiments within the spirit and scope of the invention as defined in the appended claims.

I claim:

1. An optical instrument of the telescope type including a barrel, a reticle mounted in said barrel for movement between operative and inoperative positions, spring means for moving said reticle to its inoperative position, manually operable means for moving said reticle to its operative position and for then releasing the same for movement to its inoperative position by said spring means, and means for delaying initiation of movement of said reticle to its inoperative position by said spring means following its release by said manually operable means.

2. An optical instrument of the telescope type including a barrel, a reticle mounted in said barrel for swinging movement between operative and inoperative positions, spring means for swinging said reticle to its inoperative position, manually operable means for swinging said reticle to its operative position and for then releasing the same for swinging movement to its inoperative position by said spring means, and air cylinder and piston means for retarding movement of said reticle to its inoperative position by said spring means.

3. An optical instrument of the telescope type including a barrel and a reticle mounted therein for swinging movement between an operative position in which it is disposed transversely relative to said barrel and inoperative position in which it is disposed substantially parallel to said barrel adjacent to a side thereof, a collar surrounding said barrel and rotatable with respect thereto and held against longitudinal movement therealong, and means operable by rotation of said collar to swing said reticle from its inoperative to its operative position.

4. An optical instrument of the telescope type including a barrel and a reticle mounted therein for swinging movement between an operative position in which it is disposed transversely relative to said barrel and inoperative position in which it is disposed substantially parallel to said barrel adjacent to a side thereof, a collar surrounding said barrel and rotatable with respect thereto and held against longitudinal movement therealong, spring means tending constantly to swing said reticle to its inoperative position, and means operable by rotation of said collar to swing said reticle to its operative position and then to release the same for return to its inoperative position by said spring means.

5. An optical instrument of the telescope type including a barrel and a reticle mounted therein for movement between operative and inoperative positions, a collar surrounding said barrel and rotatable with respect thereto and held against longitudinal movement therealong, spring means tending constantly to move said reticle to its inoperative position, means operable by rotation of said collar to move said reticle to its operative position and then to release the same for return to its inoperative position by said spring means, and means for delaying initiation of movement of said reticle to its inoperative position by said spring means following its release by said collar.

MAX E. BLUMENSTEIN.

REFERENCES CITED

The following references are of record in the file of this patent:

UNITED STATES PATENTS

| Number | Name | Date |
|---|---|---|
| 1,094,724 | Konig | Apr. 28, 1914 |
| 1,167,991 | Grebe | Jan. 11, 1916 |
| 1,201,764 | Richard | Oct. 17, 1916 |
| 1,313,495 | Michelson | Aug. 19, 1919 |
| 2,094,623 | Stokey | Oct. 5, 1937 |
| 2,138,067 | Mossberg | Nov. 29, 1938 |
| 2,155,390 | Arden | Apr. 25, 1939 |
| 2,189,766 | Unertl | Feb. 13, 1940 |
| 2,225,037 | Dake | Dec. 17, 1940 |
| 2,427,516 | Unertl et al. | Sept. 16, 1947 |

FOREIGN PATENTS

| Number | Country | Date |
|---|---|---|
| 9,072 | Great Britain | 1900 |